(12) United States Patent
Ducott, III et al.

(10) Patent No.: US 9,189,492 B2
(45) Date of Patent: Nov. 17, 2015

(54) CROSS-ACL MULTI-MASTER REPLICATION

(71) Applicant: Palantir Technologies, Inc., Palo Alto, CA (US)

(72) Inventors: Richard Allen Ducott, III, Burlingame, CA (US); Katherine Brainard, East Palo Alto, CA (US); John Kenneth Garrod, Palo Alto, CA (US); John Antonio Carrino, Palo Alto, CA (US)

(73) Assignee: Palatir Technoogies, Inc., Palo Alto, CA (US)

( * ) Notice: Subject to any disclaimer, the term of this patent is extended or adjusted under 35 U.S.C. 154(b) by 0 days.

(21) Appl. No.: 14/286,485

(22) Filed: May 23, 2014

(65) Prior Publication Data
US 2014/0258233 A1 Sep. 11, 2014

Related U.S. Application Data

(63) Continuation of application No. 13/355,726, filed on Jan. 23, 2012.

(51) Int. Cl.
*G06F 17/30* (2006.01)

(52) U.S. Cl.
CPC ...... *G06F 17/30174* (2013.01); *G06F 17/3023* (2013.01); *G06F 17/30348* (2013.01); *G06F 17/30575* (2013.01); *G06F 17/30578* (2013.01)

(58) Field of Classification Search
CPC ............ G06F 17/30578; G06F 17/30575; G06F 17/30348; G06F 17/30174
USPC .................................. 707/634, 638
See application file for complete search history.

(56) References Cited

U.S. PATENT DOCUMENTS

| | | | |
|---|---|---|---|
| 5,548,749 | A | 8/1996 | Kroenke et al. |
| 5,708,828 | A | 1/1998 | Coleman |
| 5,765,171 | A | 6/1998 | Gehani et al. |
| 5,870,761 | A | 2/1999 | Demers et al. |
| 6,098,078 | A | 8/2000 | Gehani et al. |
| 6,190,053 | B1 | 2/2001 | Stahlecker et al. |
| 6,202,085 | B1 | 3/2001 | Benson et al. |
| 6,216,140 | B1 | 4/2001 | Kramer |
| 6,240,414 | B1 | 5/2001 | Beizer et al. |

(Continued)

FOREIGN PATENT DOCUMENTS

| | | |
|---|---|---|
| EP | 0816968 | 1/1996 |
| WO | WO 2011/161565 | 12/2011 |
| WO | WO 2012/009397 | 1/2012 |

OTHER PUBLICATIONS

IP Australia, "Patent Examination Report No. 2" in application No. 2012238282, dated Jun. 16, 2014, 4 pages.

(Continued)

*Primary Examiner* — Shahid Alam
(74) *Attorney, Agent, or Firm* — Hickman Palermo Becker Bingham LLP; Adam C. Stone

(57) ABSTRACT

Techniques for cross-ACL multi-master replication are provided. The techniques allow a replication site in a multi-master replication system implementing an asynchronous replication protocol and an access control policy to appropriately apply received data change updates to data maintained at the site even where a data change update is missing information because of the implemented access control policy.

20 Claims, 8 Drawing Sheets

(56) References Cited

U.S. PATENT DOCUMENTS

| | | | |
|---|---|---|---|
| 6,317,754 | B1 | 11/2001 | Peng |
| 6,374,252 | B1 | 4/2002 | Althoff et al. |
| 6,539,381 | B1 | 3/2003 | Prasad et al. |
| 6,560,620 | B1 | 5/2003 | Ching |
| 6,816,941 | B1 | 11/2004 | Carlson et al. |
| 7,072,911 | B1 | 7/2006 | Doman et al. |
| 7,167,877 | B2 | 1/2007 | Balogh et al. |
| 7,437,664 | B2 | 10/2008 | Borson |
| 7,596,285 | B2 | 9/2009 | Brown et al. |
| 7,676,788 | B1 | 3/2010 | Ousterhout et al. |
| 7,730,396 | B2 | 6/2010 | Chidlovskii et al. |
| 7,818,297 | B2 | 10/2010 | Peleg et al. |
| 7,877,421 | B2 | 1/2011 | Berger et al. |
| 7,962,495 | B2 | 6/2011 | Jain et al. |
| 8,015,151 | B2 | 9/2011 | Lier et al. |
| 8,290,990 | B2 | 10/2012 | Drath et al. |
| 8,301,904 | B1 | 10/2012 | Gryaznov |
| 8,312,546 | B2 | 11/2012 | Alme |
| 8,316,060 | B1 | 11/2012 | Snyder et al. |
| 8,380,659 | B2 | 2/2013 | Zunger |
| 8,515,912 | B2 | 8/2013 | Garrod et al. |
| 8,527,461 | B2 | 9/2013 | Ducott, III et al. |
| 8,646,080 | B2 | 2/2014 | Williamson et al. |
| 8,688,749 | B1 | 4/2014 | Ducott, III et al. |
| 8,726,379 | B1 | 5/2014 | Stiansen et al. |
| 9,009,827 | B1 | 4/2015 | Albertson et al. |
| 2003/0084017 | A1 | 5/2003 | Ordille |
| 2003/0088654 | A1 | 5/2003 | Good et al. |
| 2003/0182313 | A1 | 9/2003 | Federwisch et al. |
| 2004/0103124 | A1 | 5/2004 | Kupkova |
| 2004/0111390 | A1 | 6/2004 | Saito et al. |
| 2005/0108063 | A1 | 5/2005 | Madill et al. |
| 2005/0193024 | A1 | 9/2005 | Beyer et al. |
| 2006/0036568 | A1 | 2/2006 | Moore et al. |
| 2006/0106879 | A1 | 5/2006 | Zondervan et al. |
| 2006/0155945 | A1 | 7/2006 | McGarvey |
| 2006/0190497 | A1 | 8/2006 | Inturi et al. |
| 2006/0206866 | A1 | 9/2006 | Eldrige et al. |
| 2006/0218637 | A1 | 9/2006 | Thomas et al. |
| 2006/0224579 | A1 | 10/2006 | Zheng |
| 2007/0005707 | A1 | 1/2007 | Teodosiu et al. |
| 2007/0026373 | A1 | 2/2007 | Suriyanarayanan et al. |
| 2007/0112887 | A1 | 5/2007 | Liu et al. |
| 2007/0168516 | A1 | 7/2007 | Liu et al. |
| 2007/0180075 | A1 | 8/2007 | Chasman et al. |
| 2007/0220328 | A1 | 9/2007 | Liu et al. |
| 2007/0233756 | A1 | 10/2007 | D'Souza et al. |
| 2007/0299887 | A1 | 12/2007 | Novik et al. |
| 2008/0027981 | A1 | 1/2008 | Wahl |
| 2008/0033753 | A1 | 2/2008 | Canda et al. |
| 2008/0086718 | A1 | 4/2008 | Bostick et al. |
| 2008/0141117 | A1 | 6/2008 | King et al. |
| 2008/0189240 | A1 | 8/2008 | Mullins et al. |
| 2008/0235575 | A1 | 9/2008 | Weiss |
| 2008/0243951 | A1 | 10/2008 | Webman et al. |
| 2008/0320299 | A1 | 12/2008 | Wobber et al. |
| 2009/0199090 | A1 | 8/2009 | Poston et al. |
| 2010/0011000 | A1 | 1/2010 | Chakra et al. |
| 2010/0100963 | A1 | 4/2010 | Mahaffey |
| 2010/0145909 | A1 | 6/2010 | Ngo |
| 2010/0330801 | A1 | 12/2010 | Rouh |
| 2011/0010342 | A1 | 1/2011 | Chen et al. |
| 2011/0219450 | A1 | 9/2011 | McDougal et al. |
| 2012/0005159 | A1 | 1/2012 | Wang et al. |
| 2012/0016849 | A1 | 1/2012 | Garrod et al. |
| 2012/0023075 | A1 | 1/2012 | Pulfer et al. |
| 2012/0036106 | A1 | 2/2012 | Desai et al. |
| 2012/0254129 | A1 | 10/2012 | Wheeler et al. |
| 2013/0067017 | A1 | 3/2013 | Carriere et al. |
| 2013/0173540 | A1 | 7/2013 | Qian et al. |
| 2013/0191336 | A1 | 7/2013 | Ducott et al. |
| 2013/0346444 | A1 | 12/2013 | Makkar et al. |
| 2014/0040182 | A1 | 2/2014 | Gilder et al. |
| 2014/0040714 | A1 | 2/2014 | Siegel et al. |
| 2014/0114972 | A1 | 4/2014 | Ducott et al. |
| 2014/0129518 | A1 | 5/2014 | Ducott, III et al. |
| 2015/0074050 | A1 | 3/2015 | Landau et al. |

OTHER PUBLICATIONS

Current Claims in application No. 2012238282, dated Jun. 2014, 4 pages.
Notification of Transmittal of the International Search Report and the Written Opinion of the International Searching Authority, or the Declaration received in Application No. PCT/US11/43794 dated Feb. 24, 2012 (9 pages).
Current Claims of PCT Application No. PCT/US11/43794 dated Feb. 2012 (6 pages).
The International Bureau of WIPO Switzerland, "Written Opinion and Search Report", in application No. PCT/US2011/043794 dated Jan. 24, 2013, 5 pages.
Current Claims in application No. PCT/US2011/043794 dated Jan. 2013, 6 pages.
Parker et al., "Detection of Mutual Inconsistency in Distributed Systems" IEEE Transactions on Software engineering, dated May 1983, 9 Pages.
European Search Report, EP Application No. 13152370.6-1951, dated Jun. 3, 2013, 8 pages.
Claims from EP Application No. 13152370.6, dated Jun. 2013, 5 pages.
D. Scott Parker, Jr. et al., "Detection of Mutual Inconsistency in Distributed Systems" IEEE Transactions in Software Engineering, XP 000654801, May 1993, 8 pages.
Canadian Intellectual Property Office, "Office Action" in application No. 2,666,364, dated Oct. 3, 2013, 2 pages.
Current Claims in application No. 2,666,364 dated Oct. 2013, 7 pages.
Loeliger, J., "Version Control with Git", O'Reilly Media, Inc. dated May 2009.
O'Sullivan, B., "Making Sense of Revision-Control Systems", Commmunications of the ACM, vol. 52 issue 9, dated Sep. 2009.
IP Australia, "Patent Examination Report No. 1" in application No. 2012238282, dated Jan. 30, 2014, 5 pages.
Current Australian Claims in application No. 2012238282, dated Jan. 2014, 5 pages.
Dell Latitude D600 2003, Dell Inc., http://www.dell.com/downloads/global/products/latit/en/spec_latit_d600_en.pdf.
Fridge, Colin J., "Timestamps in Message-Passing Systems," K. Raymond (Ed.) Proc. of the 11$^{th}$ Australian Computer Science Conference (ACSC 1988), pp. 56-66.
Holliday, JoAnne, "Replicated Database Recovery using Multicast Communication," IEEE 2002, pp. 11.
Lamport, "Time, Clocks and the Ordering of Events in a Distributed System," Communications of the ACM, Jul. 1978, vol. 21, No. 7, pp. 558-565.
Mattern, F. "Virtual Time and Global States of Distributed Systems," Cosnard, M., Proc. Workshop on Parallel and Distributed Algorithms, Chateau de Bonas, France:Elsevier, pp. 215-226.

CROSS-ACL MULTI-MASTER REPLICATION

CROSS-REFERENCE TO RELATED APPLICATIONS, PRIORITY CLAIM

This application claims the benefit as a Continuation of application Ser. No. 13/355,726, filed Jan. 23, 2012 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

BACKGROUND

The present disclosure generally relates to distributed computing systems and, in particular, to cross-access control list data replication in a multi-master database system.

In a typical multi-master computing system, data is stored at each replication site of a group of replication sites, data changes may be made at any site of the group, and data changes made at one site are propagated to the rest of the group. A multi-master system typically either employs a "synchronous" replication scheme or an "asynchronous" replication scheme for propagating a data change made at one site to the rest of the sites in the group.

With typical synchronous multi-master replication schemes, each data change is applied at all sites in the group immediately or at none of the sites if one or more of the sites in the group cannot accept the data change. For example, one of the sites may be offline or unavailable. Many synchronous multi-master replication schemes are implemented using a two-phase commit protocol.

In contrast, with typical asynchronous multi-master replication schemes, a data change made at a site is immediately accepted at that site but propagation of the data change to other sites in the group may be deferred. Because propagation of data changes may be deferred, if one or more of the sites in the group are temporarily unavailable, the available sites in the group can continue to accept data changes, queuing the data changes locally until they can be propagated to the rest of the group. For this reason, a multi-master system employing an asynchronous replication scheme is typically considered to be more highly available than one employing a synchronous replication scheme. However, asynchronous multi-master replication brings with it the possibility of data change conflicts that occur as a result of concurrent data changes.

A data change conflict can occur in a multi-master system employing an asynchronous replication scheme when the same data is changed at two sites before either one of those data changes can be propagated to the other. For example, assume that at site A, data representing a particular person's eye color is changed to "brown", and after that data change but before that data change can be propagated to site B, data at site B representing the same particular person's eye color is changed to "green". Without additional information, it is unclear which data change is the "correct" change that should be adopted by all sites in the group.

Typically, a multi-master system employing an asynchronous replication scheme provides a mechanism for "deconflicting" data change conflicts. In many cases, deconflicting a data change conflict means to detect and resolve the data change conflict such that the resolution of the data change conflict is adopted at all sites. In some cases, the multi-master system may be able to deconflict a data change conflict automatically without requiring user intervention. In other cases, user intervention is required to decide which of the concurrent data changes should be adopted as the "correct" data change.

One possible approach for detecting data change conflicts in a multi-master system employing asynchronous replication is through the use of version vectors (sometimes referred to as vector clocks). A version vector may be defined as a logical timestamp associated with a data change, and provides a partial ordering of the associated data change with respect to other data changes. The logical timestamp is called "logical" in that its value has no inherent relation to real "physical" time. Typically, the logical timestamp is represented as a list of logical clocks, one logical clock per site in the system. The partial ordering is called "partial" in that a version vector does not provide a total ordering of the associated data change with respect to all other data changes in the system. Instead, two version vectors associated with two distributed data changes (i.e., two data changes at two different sites) can be compared to determine whether one data change happened before the other or whether the two data changes happened concurrently and thus, are mutually inconsistent (i.e., represent a data change conflict). Use of version vectors for detecting mutual inconsistencies in distributed systems is well documented, see e.g., "Detection of Mutual Inconsistency in Distributed Systems", published by the Institute of Electrical and Electronics Engineers (IEEE) as IEEE Transactions on Software Engineering, VOL. SE-9, No. 3, May 1983, the disclosure of which is hereby incorporated by reference.

When used in the context of a multi-master system, a single version vector is typically maintained at each site in the system. When a site propagates a data change to another site, the propagating site includes its current version vector in the notification. The site receiving the notification can compare its version vector to the version vector received in the notification. This comparison can be used to determine whether the propagated data change happened before, happened after, or happened concurrently with the latest data change at the site receiving the notification.

Access control adds an additional layer of complexity to multi-master replication on top of the complexity of detecting data change conflicts. In particular, some sites in a multi-master system may implement access control policies that limit the information that is shared with other sites in the group. Further, a site may share certain information with some sites in the group that it does not share with other sites in the system. Many existing multi-master replication solutions employ version vectors on a per-site basis for detecting data change conflicts. These solutions do not adequately address the complexity introduced by access control.

Consider, for example, a multi-master system with four sites A, B, C, and D in which site A propagates data changes directly to sites B and C and sites B and C propagate data changes directly to site D but site A does not propagate data changes directly to site D. Further assume that, for security policy reasons, site A does not propagate certain information to site B even if that certain information is changed at site A and that site A does not propagate other certain information to site C even if that other certain information is changed at site A. Assume further still that site A does propagate to site B the other certain information that it does not propagate under the security policy to site C and that site A does propagate to site C the certain information it does not propagate to site B. For example, site A may not propagate social security numbers to site B and may not propagate home address information to site C. Finally, assume that there are no restrictions on the information propagated from sites B and C to site D.

Next, assume the following sequence of events that occur in the multi-master system:

Event 1: A data record $R_a$ is created at site A with values for the three fields of the data record: "Name", "Social Security Number", and "Home Address".

Event 2: Site A propagates to site B information reflecting the data change to site A at Event 1 including the Name and Home Address information of the record $R_a$ but for access control reasons not the Social Security Number information of the record $R_a$. As a result, a data record $R_b$ is stored at site B with the values for the Name and Home Address fields received from site A.

Event 3: Site A propagates to site C information reflecting the data change to site A at Event 1 including the Name and Social Security Address information of the record $R_a$ but for access control reasons not the Home Address information of the record R. As a result, a data record $R_c$ is stored at site C with the values for the Name and Social Security Number fields received from site A.

Event 4: The value of the Name field of record $R_b$ is changed at site B to "John M. Smith". Concurrently, the value of the Name field of record $R_c$ is changed at site C to "J. M. S." creating a data change conflict.

Event 5: Site B propagates to site D information reflecting the data change to site A at Event 1 and the data change to site B at Event 4 including the Name "John M. Smith" from record $R_b$ and the Home Address information from record $R_b$. A data record $R_d$ is stored at site D with the values for the Name and Home Address fields received from site B.

Event 6: Site C propagates to site D information reflecting the data change at site A at Event 1 and the data change at site C at Event 4 including the Name "J.M.S." from record $R_c$ and the Social Security Number from record $R_c$.

At Event 6 in the above example, per-site version vectors could be used to detect at site D that the record $R_c$ conflicts with the record $R_d$ by virtue of the concurrent updates to the Name fields of records $R_b$ and $R_c$ at Event 4. However, site D cannot determine from use of per-site version vectors alone whether the data change at site B at Event 4, in addition to changing the value the Name field, also deleted the Social Security Number field from record $R_b$. Similarly, site D cannot determine whether the data change at site C at Event 4, in addition to changing the value of the Name field, also deleted the Home Address field from record $R_c$. Ideally, in this case where the Social Security Number field and the Home Address field were not deleted but instead were filtered at site A implementing an access control policy, the resulting record $R_d$ at site D after Event 6 would have values for all of the Name, Social Security Number, and the Home Address fields. Specifically, the record $R_d$ would have as the value of the Name field either "John M. Smith" or "J.M.S" depending on how this data change conflict is deconflicted at site D, the value of the Home Address field received from site B, and the value of the Social Security Number field received from site C. Alternatively, if the Home Address field was deleted at Event 4, then the record $R_d$ at site D after Event 6 should reflect the deletions.

The above-example is provided to illustrate an example of an issue left unaddressed by existing multi-master replication solutions. Problems in the field include detection of data change conflicts in a multi-master system while at the same time facilitating differentiation between a situation where a conflicting data change is missing information because the missing information was filtered under an access control policy and a situation where a conflicting data change is missing information because the missing information was deleted as part of the data change. More generally, the problem is providing multi-master replication in access controlled replication environments in a manner that is in line with user expectations.

BRIEF DESCRIPTION OF THE DRAWING(S)

DETAILED DESCRIPTION OF EMBODIMENT(S)

Figure 1:
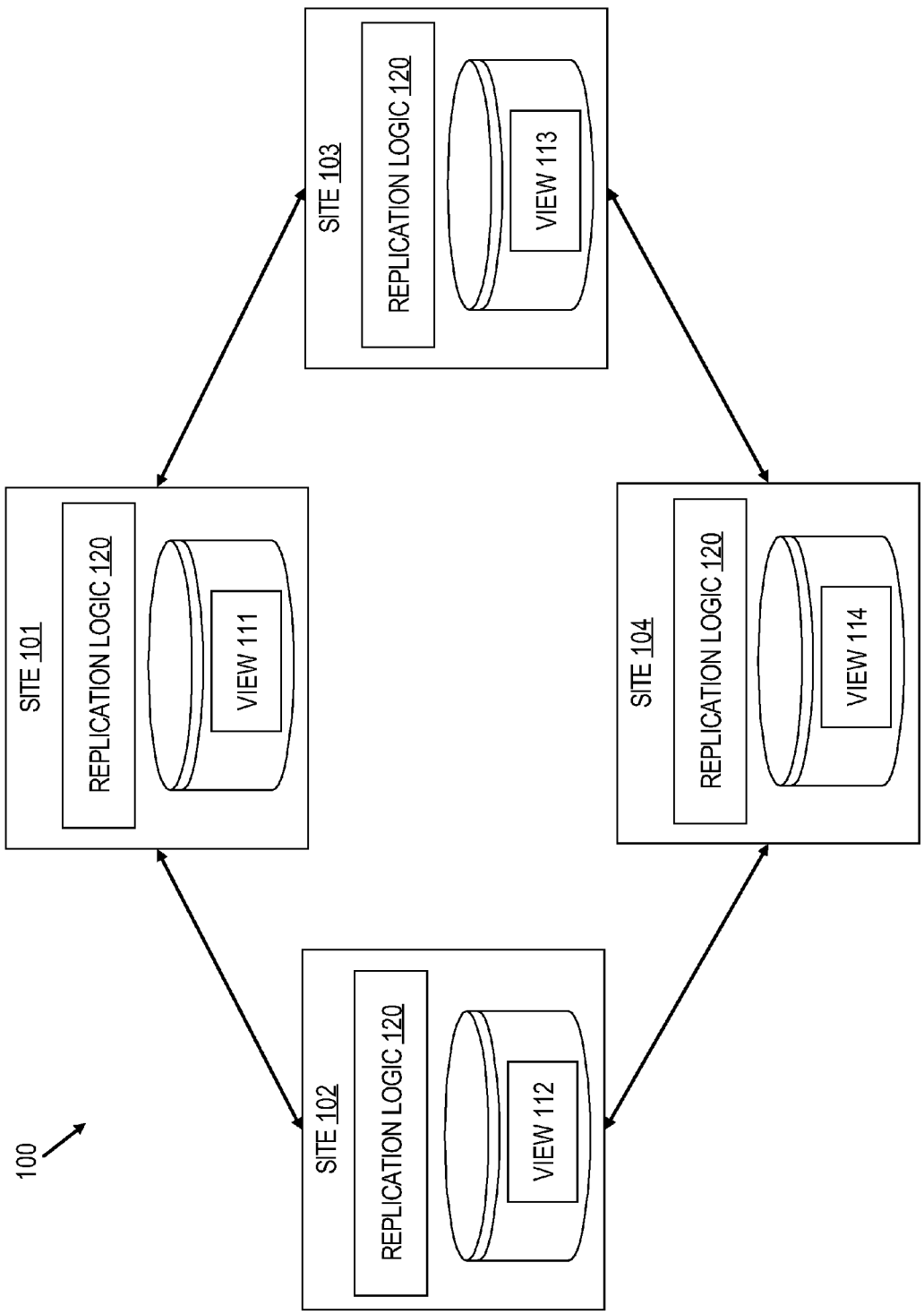
FIG. 1 is a block diagram of a multi-master topology having a plurality of replication sites each configured with replication logic.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Cross-ACL Multi-Master Replication—Overview

In an embodiment, a technique for "cross-ACL" multi-master replication is provided that allows a replication site in a multi-master system implementing an asynchronous replication protocol and an access control policy to appropriately apply received data change updates to data maintained at the site even where a data change update is missing information because of the implemented access control policy. In this context, the term "ACL" is short for access control list. An "access control list" may be any data that specifies, either directly or indirectly, what operations may be performed using associated access controlled data and who or what may perform those operations. For example, an access control list may specify that "everyone" can "read" the associated access controlled data but that only "supervisors" can "write" the access controlled data. As another example, an access control list may classify the access controlled data as "top secret" such that only users having "top secret" clearance can use (e.g., read or write) the access controlled data.

The term "cross-ACL" refers to the notion that data change updates may be propagated amongst replication sites that define different ACLs that govern what information is shared amongst the replication sites. As a result, some replication sites may receive data change updates for certain access controlled data that other replication sites never receive a data change update for and thus, the other replication sites have no "knowledge" of even the existence of the certain access controlled data. For example, a replication site A may be configured to not share with replication site B any data that it maintains that is classified as "top secret" according to an ACL. At the same time, replication site A may be configured to share "top secret" data with replication site C. Significantly, if replication site B shares data changes with replication site D, replication site B cannot inform replication site D that it did not receive the certain "top secret" information from replication site A because replication site B has no "knowledge" of even the existence of that "top secret" information, which is desirable in terms of access control policy because even mere knowledge of the existence of "top secret" data, for example, even without any knowledge about the contents of the data, may be considered a security breach. At the same time, if replication site D received the certain "top secret" information from site C, replication site D needs to appropriately apply data change updates it receives from site B to data it has already received from site C. This and other cross-ACL replication scenarios are addressed in part through the use of per-access controlled data object data unit version vectors. In one embodiment, this and other cross-ACL replication scenarios are addressed through use of per-access controlled data object version vectors.

According to the technique, data changes at each replication site are viewed as being made to access controlled data object data units, or "AC data units" for short. An "AC data unit" is any logical portion or component of a data object under access control. A "data object" may be any entity that includes AC data units that are protected by access control lists. For example, within a database system, data objects could include database records, database table rows, database entities, database objects, etc. and AC data units could include properties, fields, attributes, columns, etc. of data objects under access control. Within a file system, data objects could include documents, files, directories, etc. and AC data units could include portions of documents or files under access control, files in directories under access control, etc.

To facilitate cross-ACL multi-master replication, each replication site maintains version vectors on a per-AC data unit basis rather than on just a per-replication site basis or per-data object basis. This per-AC data unit versioning with version vectors allows replication sites in a multi-master system to appropriately apply data change updates received from other replication sites where the data change updates reflect only a partial or incomplete view of the data changes due to access control restrictions.

The general methodology proceeds as follows. When a data change is made to an AC data unit at a replication site, the version vector associated with the AC data unit at the site is incremented in accordance with a versioning protocol. Details of the versioning protocol including what it means to increment a version vector in accordance with protocol are described below. A "data change" refers to adding an AC data unit to a data object maintained at a site, removing (deleting) an AC data unit from a data object maintained at a site, or changing (modifying) an AC data unit of a data object maintained at a site.

Next, the replication site determines whether to share (propagate) the data change with one or more other replication sites (peer sites) under the access control policy the replication site is configured with. The group of replication sites is arranged in a pre-defined multi-master topology (i.e., a fully meshed or partially meshed topology). Each site in the group is configured to share data changes with one or more other sites in the group in accordance with the pre-defined topology. For a given site, the other sites the given site is configured to share data changes with may be referred to as the given site's "peers". Depending on topology configuration (i.e., a fully meshed or partially meshed topology), a site may not "peer" with every other site in the group.

The access control policy at a site may be implemented as an ACL-filter which serves to filter (limit) the AC data units shared by the site with another replication site based on the ACLs associated with AC data units at the site. For example, an ACL-filter may specify that no AC data units associated with a "top secret" ACL are to be shared with a particular peer site. A replication site can employ a different ACL-filter for different peer sites that it shares data changes with. Thus, under two different ACL-filters a site may share updated AC data units with one peer site that it does not share with another peer site.

Assuming the replication site determines to share the data change with a peer site, the replication site sends a data change update to the peer site. For clarity of explanation, the site at which the data change to the AC data unit was made is referred to as the "changing site" and the peer site receiving notification of the data change in the data change update is referred to as the "receiving site". The data change update sent by the changing site typically includes an identifier of the data object that the updated AC data unit is a part of, data representing the change to the AC data unit at the changing site, the ACL associated with the AC data unit at the changing site, and the version vector associated with the AC data unit at the changing site. By including the ACL associated with the AC data unit at the changing site in the data change update, changes to ACLs can be propagated throughout the multi-master system. The data change update may include other information including information related to updates to other AC data units, even AC data units for other data objects.

Upon receiving the data change update, the receiving site determines whether it maintains a view of the data object that the updated AC data unit is a part of. If, for example, the data object was not first created at the receiving site or the data change update is the first data change update received for the data object at the receiving site, then the receiving site might not maintain a view of the data object when the data change update is received. If the receiving site does not maintain a view of the data object, then the receiving site creates a view of the data object at the receiving site. Here, where the receiving site does not yet maintain a view of the data object, the receiving site treats the AC data units for the data object in the data change update as if they "happened after" the current view of the data maintained at the receiving site in which no version of the data object exists. In creating the view of the data object, the receiving site uses the information about the data object received in the data change update including the identifier of the data object that the updated AC data unit is a part of, the data representing the change to the AC data unit at the changing site, the ACL associated with the AC data unit at the changing site, and the version vector associated with the AC data unit at the changing site. As a result, the receiving site now maintains a view of the data object reflected by the data change update.

On the other hand, if the receiving site does maintain a view of the data object when the data change update for the data object is received, then the receiving site initially determines whether there are any data change conflicts (i.e., mutual inconsistencies) between an AC data unit maintained for the data object at the receiving site and an AC data unit for the data object included in the data change update. For clarity of explanation, AC data units of a data object maintained at a replication site will be referred to hereinafter as "AC data units" of the data object while AC data units for the data object sent in a data change update will be referred to hereinafter as "data object data unit updates" for the data object, or just "data unit updates" for short.

For a given data unit update for a data object, determining whether the data unit update conflicts with an AC data unit of the data object maintained at the receiving site initially includes determining whether the data object maintained at the receiving site has an AC data unit that corresponds to the given data unit update. This correspondence may be determined in any number of ways including, for example, through use of per-AC data unit identifiers or a combination of a data object identifier and other information for identifying a particular AC data unit from amongst a set of AC data units for the data object.

If the data unit update has a corresponding AC data unit, then the version vector associated with the data unit update is compared to the version vector associated with the corresponding AC data unit maintained at the receiving site. This comparison is made in accordance with the versioning protocol as described in greater detail below. In sum, as one skilled in the art will appreciate, the comparison reveals whether the data unit update "happened before", "happened after", or "happened concurrently with" (i.e., conflicts with) the corresponding AC data unit at the receiving site.

If the data unit update happened concurrently with the corresponding AC data unit at the receiving site, then there exists a conflict between the data change update for the data object and the data object maintained at the receiving site. In accordance with an embodiment, the receiving site deconflicts all such conflicts for the data object before applying any data unit updates for the data object to the data object maintained at the receiving site. By deconflicting all conflicts between the data change update for the data object and the data object maintained at the receiving site before applying the data change update to the data object maintained at the receiving site, data integrity at the receiving site is improved in the case where more than one data unit update for the data object received in the data change update conflicts with an AC data unit of the data object at the receiving site. This improved data integrity is because each deconfliction of each of the multiple conflicts for the data object is assumed to be consistent with one another. In some cases, deconfliction between a conflicting data unit update and a corresponding AC data unit occurs automatically at the receiving site according to pre-defined rules or heuristics. For example, when the data unit update and the corresponding AC data unit represent the same value. In other cases, user intervention is required to decide which of the conflicting data unit update and corresponding AC data unit should be adopted at the receiving site.

After any and all conflicts between the data change update for a data object and the data object maintained at the receiving site have been deconflicted, the receiving site applies the data change update for the data object to the data object maintained at the receiving site. This applying occurs on a data unit update by data unit update basis. In particular, if a given data unit update for the data object does not have a corresponding AC data unit maintained at the receiving site, then the given data unit update is added to the data object maintained at the receiving site. Here, similar to the case where the receiving site does not maintain a view of the data object when a data change update for the data object is received, the receiving site treats the data unit update for the data object as if it "happened after" the current view of the data object maintained at the receiving site.

On the other hand, if the given data unit update does have a corresponding AC data unit maintained at the receiving site, then the data unit update is applied to the corresponding AC data unit depending on the outcome of the comparison between the version vectors for the data unit update and the corresponding AC data unit. If particular, if the comparison revealed that the data unit update happened before the corresponding AC data unit, then the data unit update is not applied to the corresponding AC data unit. If the comparison revealed that the data unit update happened after the corresponding AC data unit, then the data unit update is applied to the corresponding AC data unit. In this case, where the data unit update is applied to the corresponding AC data unit, the version vectors for the data unit update and the corresponding AC data unit are merged in accordance with the version protocol as discussed in greater detail below. The resulting merged version vector becomes the new version vector for the corresponding AC data unit at the receiving site and reflects that the data unit update has been incorporated into the corresponding AC data unit at the receiving site. If the comparison revealed that the data unit update conflicts with the corresponding AC data unit, then the result of the deconfliction between the data unit update and the corresponding AC data unit is applied to the corresponding AC data unit. In this case where there is a conflict, the version vectors are merged and the resulting merged version vector is incremented in accordance with the versioning protocol.

In the manner described, maintaining version vectors on a per-AC data unit basis rather than on just a per-replication site basis or a per-data object basis, allows replication sites in a multi-master system to appropriately apply data change updates received from other replication sites where the data change updates reflect only a partial or incomplete view of the data changes due to access control restrictions.

The above discussion provides an overview of the cross-ACL multi-master replication method in one embodiment. A specific sample embodiment is described below.

Exemplary Multi-Master Replication Environment

FIG. 1 is a block diagram illustrating a multi-master replication environment 100 comprising a plurality of replication sites 101, 102, 103, and 104 each configured with replication logic 120. As shown, site 101 and site 102 are operatively coupled to one another, site 101 and site 103 are operatively coupled to one another, site 102 and site 104 are operatively coupled to one another, and site 103 and site 104 are operatively coupled to one another.

Replication sites may be operatively coupled to one another as part of a computer network that links the sites together from time to time (or permanently). Suitable types of computer networks for linking sites together include, but are not limited to, local area networks (LANs), virtual private networks (VPNs), metropolitan area networks (MANs), campus area networks (CANs), and wide area networks (WANs) including the Internet. It is not necessary that a highly or continuously available computer network link replication sites and the computer network linking any two sites may only be periodically available. Further, replication sites need not be linked together by any computer network and data may be transported between these "disconnected" replication sites manually using a portable data storage medium such as a Compact Disc (CD), a Digital Versatile Disc (DVD), Universal Serial Bus (USB) flash device, etc.

The replication logic 120 and the view (e.g., view 111) at a replication site (e.g., site 101) may be embodied in a single computing device. Alternatively, the replication logic and the view may be embodied in multiple computing devices such as one or more workstation computers, server computers, laptop computers, mobile computing devices, or combinations thereof operatively coupled to one another via one or more computer networks or other data communication mechanism. Further, while only four replication sites are shown in FIG. 1, other embodiments may use a multi-master replication environment with as few as two replication sites up to a multi-master replication environment with many hundreds or many thousands of replication sites.

Each replication site 101, 102, 103, 104, etc. has a view 111, 112, 113, 114, etc. of more or less the same body of data. A view may, for example, be stored in (contained in) one or more tables in a relational database. However, other data containers and data structures including other types of databases may be used to contain a view. The particular data container, data structure, or database that is used may vary in different embodiments.

With respect to the body of data, site 101 is configured to asynchronously propagate to sites 102 and 103 changes made to view 111. Site 102 is configured to asynchronously propagate to sites 101 and 104 changes made to view 112. Site 103 is configured to asynchronously propagate to sites 101 and 104 changes made to view 113. Site 104 is configured to asynchronously propagate to sites 102 and 103 changes made to view 114. Thus, site 101 and site 102 may be replication peers, site 101 and site 103 are replication peers, site 102 and site 104 are replication peers, and site 103 and site 104 are replication peers. However, site 101 and site 104 are not replication peers and neither are sites 102 and 103.

The replication environment 100 of FIG. 1 represents a partially meshed replication topology. That is, at least one site in the topology is not configured to asynchronously propagate changes to its view to at least one other site in the topology. In this case, one or more other sites may act as intermediary sites for propagating changes between the sites that are not configured to directly propagate changes to each other (i.e., between sites that are not replication peers).

For example, in the replication topology of FIG. 1, site 101 is not configured to propagate changes to view 111 directly to site 104. However, site 101 is configured to propagate changes to view 111 directly to sites 102 and 103 and sites 102 and 103 are configured to propagate changes to views 112 and 113 respectively directly to site 104. Thus, site 104 learns of data changes to view 111 from sites 102 and 103 after sites 102 and 103 have applied the changes into their respective views 112 and 113 and propagated the changes to site 104.

While a partially meshed replication topology is depicted in FIG. 1, a fully meshed replication topology may be used in which each site in the topology is configured to propagate changes to its view directly to every other site in the topology.

The replication logic 120 at each site 101, 102, 103, 104, etc. employs an asynchronous replication scheme. That is, a change to a view at a site may be immediately applied at the site but propagation of the change to other sites in the topology may be deferred for a period of time. Thus, each view 111, 112, 113, 114, etc. may diverge (be inconsistent) from time to time such that at any given moment one view 111, 112, 113, 114, etc. is inconsistent with another view 111, 112, 113, 114, etc. Typically, in the absence of new changes to any view 111, 112, 113, 114, etc. for a period of time, the views 111, 112, 113, 114, etc. eventually become consistent with one another. Thus, the views 111, 112, 113, 114, etc. can be said to be both loosely consistent and eventually consistent.

Very generally, two views are consistent with one another with respect to a historical point in time if both sites have been informed of all of the other's changes to their respective views since the historical time point. Two views can be consistent with one another even though the two views are not identical. For example, information in one view may be data typed differently than the same information in another view with which the first view is consistent. For example, in one view a phone number is stored as a numerical data type while in another view the same phone number is stored as a string data type. As another example, information in one view may be data formatted differently than the same information in another view that the first view is consistent with (e.g., in one view a phone number is stored as the string "(555) 555-5555" while in another view the same phone number is stored as the string "555.555.5555").

Each site 101, 102, 103, 104, etc. in the topology has replication logic 120 for performing cross-ACL replication. In some embodiments, the replication logic 120 is implemented in software (e.g., driver, module, application, or the like) operating in a computer network-connected environment running under an operating system, such as the Microsoft® Windows® operating system or a Unix®-type (e.g., Linux®) operating system. However, the replication logic 120 is not limited to any particular implementation, any particular application, or any particular environment. For example, the replication logic 120 may be implemented in a combination of hardware and software. As another example, the replication logic 102 may be part of an operating system or a component of a database server system or a component of database application or web application.

The above-described multi-master replication environment is presented for purposes of illustrating the basic underlying components of an embodiment. For the purposes of illustrating a clear example, the following description will present examples in which it will be assumed there exists four replication sites arranged in a partially meshed replication topology, but a partially meshed replication topology consisting of four replication sites is not necessary and other embodiments may use any type of multi-master replication topology or processing environment capable of supporting the methodologies presented herein.

Data Objects and Access Controlled Data Object Data Units (AC Data Units)

Figure 2:
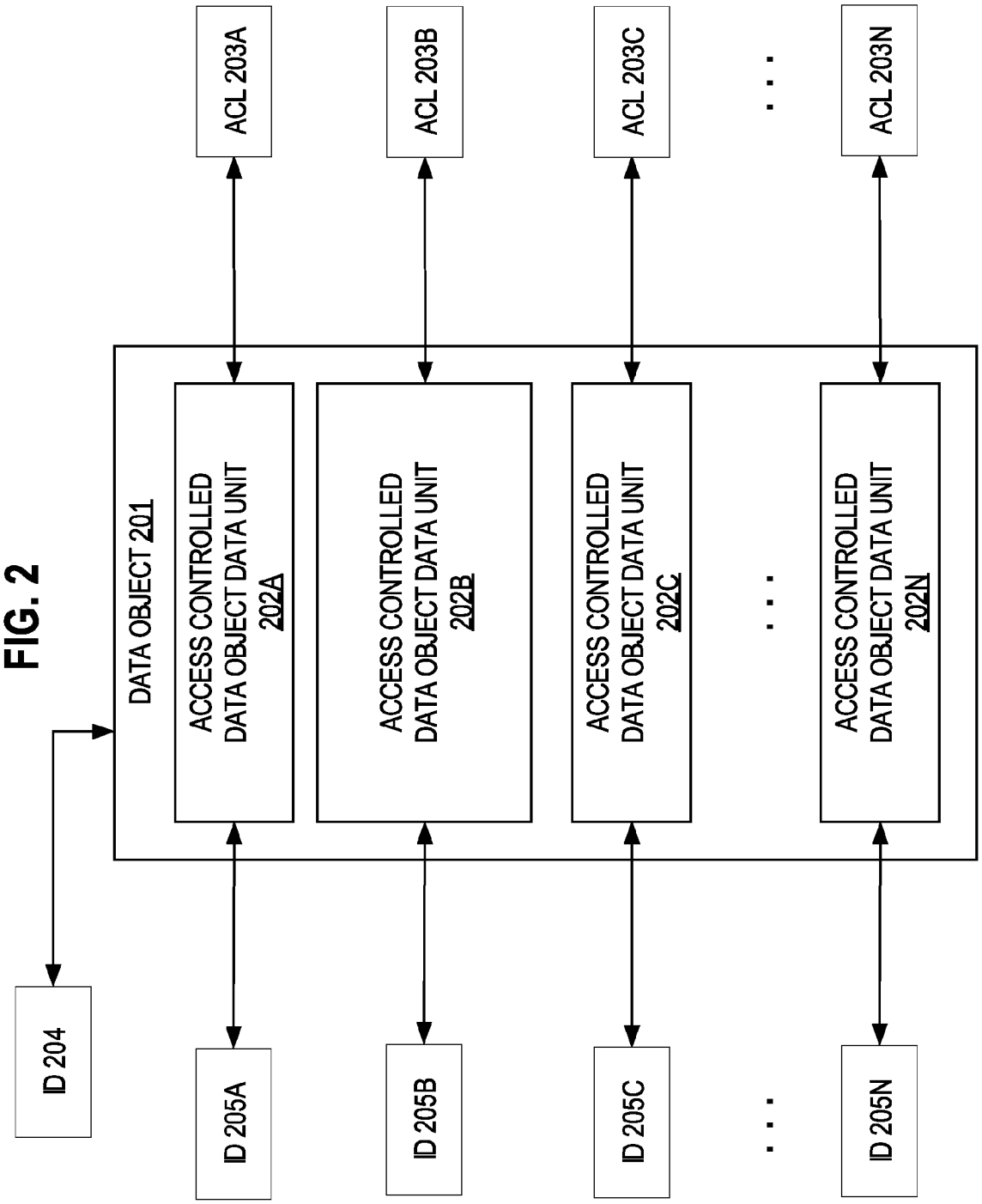
FIG. 2 is a block diagram of a data object that includes access controlled data object data units.

Referring now to FIG. 2, the replication logic 120 at a site 101, 102, 103, 104, etc. views data of the view 111, 112, 113, 114, etc. at that site as a collection of data objects 201. How the replication logic 120 views data of the view may be different than how the data is stored as part of the view. A data object 201 may correspond to a row or rows of a relational database table or tables or correspond to one or more file system files, as examples.

Broadly speaking, a data object 201 is a container for information representing a thing or things in the real world. For example, a data object 201 can represent an entity such as a person, a place, an organization, a concept, or other noun. A data object 201 can represent an event that happens at a point in time or for a duration, for example. A data object 201 can represent a document or other unstructured data source such as an e-mail message, a news report, or a written paper or article, as another example.

As shown in FIG. 2, a data object 201 may comprise one or more access controlled data object data units (AC data units) 202A-N. An AC data unit 202 represents a portion or portions or a component or components of the data object 201 that is under access control as specified by an associated Access Control List (ACL) 203. The ACL 203 is a set of one or more permissions that govern use (e.g., read access, write access, etc.) of the associated AC data unit 202. A permission in an ACL 203 may be expressed in a variety of different forms in various embodiments. For example, a permission may specify a set of one or more trustees (e.g., a user) and one or more use rights (e.g., read access, write access, etc.) of those trustees with respect to the associated AC data unit 202. As another example, a permission may specify a minimum security classification level (e.g., unclassified, secret, or top secret) such that only users that posses the minimum security classification level can use (e.g., read, write, etc.) the associated AC data unit 202. In other embodiments, other forms for expressing an ACL permission may be used.

As mentioned, each AC data unit 202A-N of a data object 201 corresponds to a portion or portions or a component or components of the data object 201. For example, an AC data unit 202 may correspond to a property of a data object 201 or a portion of a document 201. Each AC data unit 202A-N need not be the same data size or correspond to contiguous portions of the data object 201.

In some embodiments, an AC data unit 202 corresponds to a property or attribute of the data object 201 that represents an individual data item. Each property of the data object 201 may have a type and a value. Different types of data objects 201 may have different types of properties. For example, a Person data object 201 might have an Eye Color property and an Event data object 201 might have a Date property. In some embodiments, the set of property types available for typing data stored as part of a view 111, 112, 113, 114, etc. is defined according to a pre-defined or user-defined ontology or other data type schema associated with the view. In addition, in some embodiments, a data object 201 has more than one property of the same type. For example, a Person data object 201 might have multiple Address properties or multiple Name properties.

Each data object 201 is associated with an identifier 204 that uniquely identifies the data object within the multi-master system. The identifier 204 may be included in data change updates to identify data objects 201 to which the data change updates pertain. The identifier 204 may be any data suitable for identifying the data object 201. For example, the identifier 204 may be a name, a number, or other byte sequence.

Each AC data unit 202 of a data object 201 may also be associated with an identifier 205. The identifier 205 associated with a AC data unit 202 may uniquely identify the associated AC data unit 202 amongst the other AC data units of the data object 201 or may uniquely identify the associated AC data unit 202 amongst all AC data units 202 for all data objects 201 in the multi-master system. The identifier 205 may be included in data change updates to identify AC data units 202 to which the data change updates pertain.

The above-described data object view is presented for purposes of illustrating general aspects of an exemplary AC data unit that may be replicated amongst sites in a multi-master system. For the purposes of discussion, the following description will present examples in which it will be assumed data objects have properties. In other embodiments, correspondence between AC data units and data object properties is not necessary and in other embodiments AC data units correspond to other types of portions or components of data objects capable of supporting the methodologies presented herein. As but one example, an AC data unit may correspond to a portion of a document under access control or a file in a file system directory.

ACL-Based Replication Filters

Figure 3:
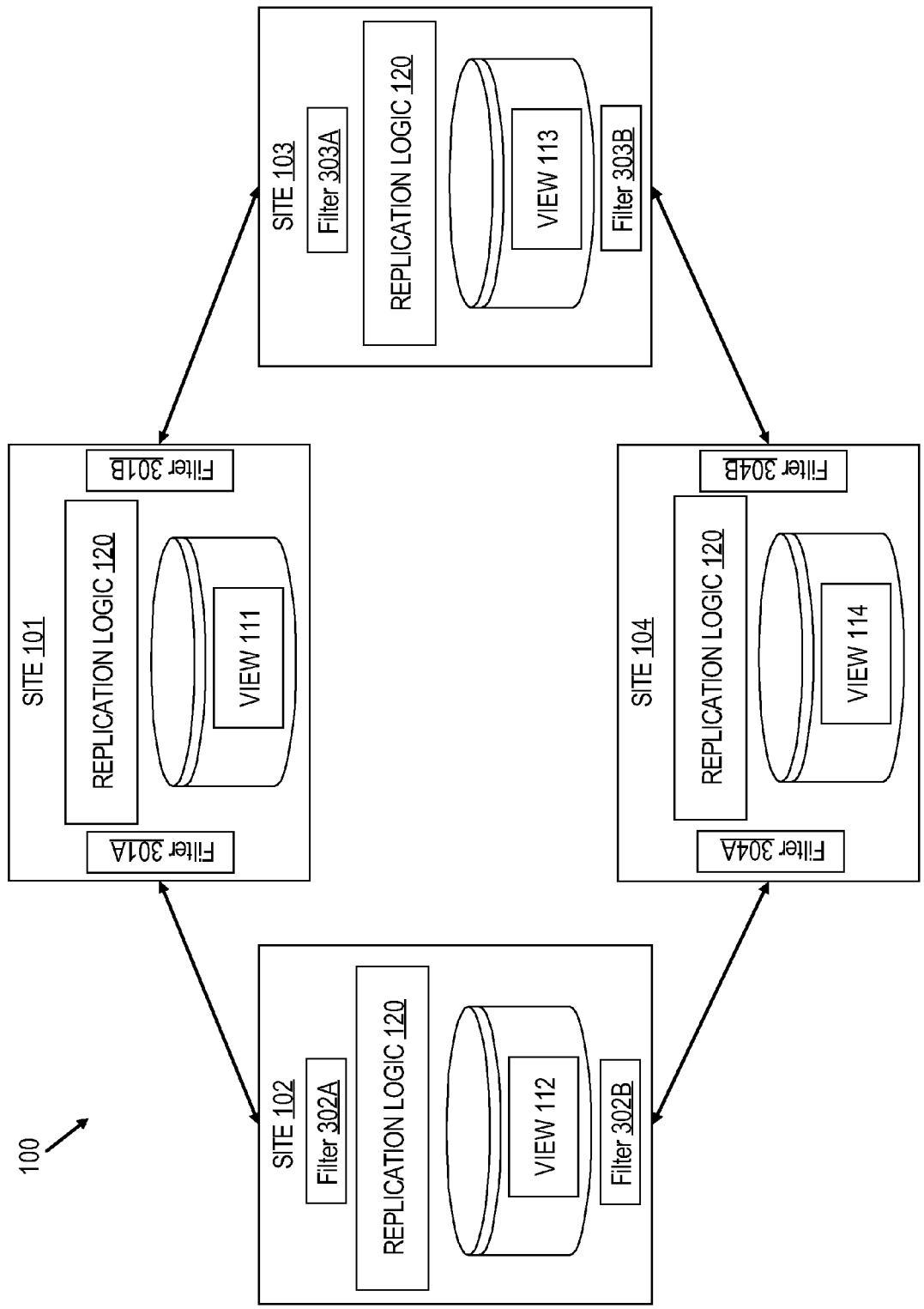
FIG. 3 is a block diagram of a multi-master topology having a plurality of replications sites each configured with replication logic and ACL-based replication filters.

Referring now to FIG. 3, each replication site 101, 102, 103, 104, etc. may be configured with one or more ACL-based replication filters 301A, 301B, 302A, 302B, 303A, 303B, 304A, 304B, etc. As discussed above, an ACL-based replication filter functions to restrict (limit) the AC data units 202 that a particular replication site 101, 102, 103, 104, etc. shares with its replication peers in data change updates. For example, filter 301A at site 101 limits the AC data units 202 that site 101 shares with site 102 and filter 301B limits the AC data units 202 that site 101 shares with site 103. Filter 302A at site 102 limits the AC data units 202 that site 102 shares with site 101 and filter 302B restricts the AC data units 202 that site 102 shares with site 104. Filter 303A at site 103 limits the AC data units 202 that site 103 shares with site 101 and filter 303B restricts the AC data units 202 that site 103 shares with site 104. And filter 304A at site 104 limits the AC data units 202 that site 104 shares with site 102 and filter 304B restricts the AC data units 202 that site 104 shares with site 103.

In operation, when a replication site 101, 102, 103, 104, etc. is about to send to a replication peer a data change update that includes AC data units 202, the site consults (applies) the ACL-based replication filter configured for the replication peer to the data change update to determine if any of the AC data units 202 in the data change update should be "dropped" from the data change update before it is sent to the replication peer. For example, when site 101 sends a data change update to site 102, site 101 first consults filter 301A to determine whether any AC data units 202 in the data change update should be dropped before the data change update is sent to site 102. Dropping an AC data unit 202 from a data change update means that the data change update sent to the peer site does not contain any information about the dropped AC data unit 202 including any information that would reveal the existence of the AC data unit 202 to the peer site.

The AC data units 202 that are dropped from the data change update are those that are associated with ACLs 203 that satisfy the ACL-based replication filter. For example, if filter 301A specifies that no AC data units 202 classified as "top secret" are to be shared with site 102, then site 101 will drop all AC data units 202 associated with a "top secret" ACL 203 from data change updates sent to site 102. A filter 301, 302, 303, 304, etc. may be expressed in any convenient form for identifying ACLs 203. For example, a filter may include an enumeration of ACLs 203 or ACL 203 identifiers, regular expressions, or other types of expressions or rules for identifying ACLs 203.

As mentioned previously, each replication site 101, 102, 103, 104, etc. may be configured with different filters for different replication peers. For example, filter 301A at site 101 may be different than filter 301B. In this scenario, two or more data change updates for the same data change may include different sets of AC data units 202 as a result of the differing filters. Returning to a previous example discussed in the Background section, the data change update sent to site 102 might include AC data units 202 for the "Name" and "Social Security Number" properties of a changed data record in view 111 while the data change update sent to site 103 might include AC data units 202 for the "Name" and "Home Address" properties for the same change even though the change to the data record in view 111 involved a change to all three AC data units "Name", "Social Security Number", and "Home Address".

Two replication sites that peer with each other need not be configured with the same filter. For example, filter 301A may be different than filter 302A. Further, a filter may be configured in only one replication direction between two replication peers. For example, site 101 may be configured with a filter for data change updates sent to site 102 while site 102 may send data change updates to site 101 without filtering. Still further, not every replication site 101, 102, 103, 104, etc. need be configured with a filter and some replication sites may share data change updates with their replication sites without filtering.

Per-Access Controlled Data Object Data Unit Version Vectors

In an embodiment, in order to facilitate cross-ACL multimaster replication, each site 101, 102, 103, 104, etc. maintains version vectors on a per-AC data unit 202 basis. In particular, each site 101, 102, 103, 104, etc. maintains one version vector for each AC data unit 202 the site maintains in its view 111, 112, 113, 114, etc. In another embodiment, each site maintains version vectors on a per-data object 201 basis.

Figure 4:
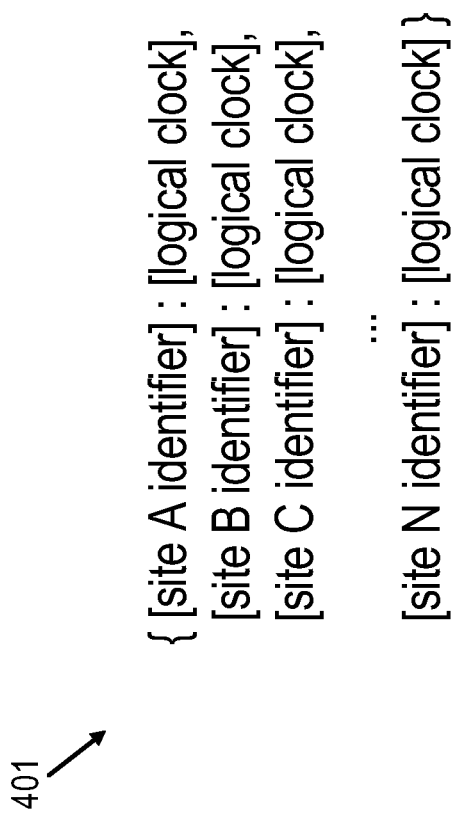
FIG. 4 is a conceptual diagram of a version vector.

Referring now to FIG. 4, a conceptual representation of a version vector 401 uses an associative array notation. Embodiments do not require that version vectors be stored in data memory as associative arrays and any data structure suitable for the implementation at hand may be used. The version vector 401 may be associated with an AC data unit 202 at the replication site where the AC data unit 202 is maintained. The version vector 401 includes up to m elements, where m is the number of replication sites in the system. Thus, each element in the version vector 401 corresponds to a replication site 101, 102, 103, 104, etc. in the system. Each element of the version vector includes a logical clock for the associated data unit 202 at the site corresponding to the element. The logical clock is typically represented as monotonically increasing sequence number that starts at some default value (e.g., 0). In a practical embodiment, to conserve data storage space, data maintained at a site 101, 102, 103, 104, etc. representing a version vector 401 may not represent all m elements, but instead some subset of the m elements. For example, elements of the version vector 401 that have the default value (e.g., zero) may not be represented. Since it may often be the case that only a few sites make changes to the associated AC data unit 202, omitting representation of default values in version vectors 401 can save considerable data storage space at sites.

Each site 101, 103, 103, 104, etc. has, in each version vector 401 that the site maintains, its own logical clock value as one of the elements in the version vector 401. This logical clock value represents the version of the associated AC data unit 202 at the site maintaining the version vector 401. Each other element in the version vector 401 represents the site's "best guess", based on the data change updates the site has received, of the version of the associated AC data unit 202 at the site corresponding to the other element.

Each logical clock value of a version vector 401 is initially at some default value (e.g., zero). When a site changes an AC data unit 202 that the site maintains such as, for example, as part of a database transaction against the site's view, the site increments its own logical clock in the version vector associated with AC data unit 202 by a fixed value (e.g., one). When sharing the change with a peer site as a data change update, assuming the change is not filtered by an ACL-based replication filter, the site includes, in the data change update, data representing the change to the AC data unit 202 at the changing site and data representing the site's version vector for the AC data unit 202 after the increment. A site receiving the data change update can compare the version vector for the AC data unit 202 in the data change update with its own version vector for the AC data unit 202 (assuming the receiving site maintains a view of the AC data unit) to determine whether the version of the AC data unit 202 at the receiving site and the version of the AC data unit 202 in the update are: identical, ordered, or concurrent. Stated otherwise, the receiving site can compare the version vectors to determine whether:

(1) the receiving site already maintains the same version of the AC data unit 202 indicated in the data change update (i.e., identical versions), (2) the change to the AC data unit 202 reflected in the data change update "happened before" the latest change to the AC data unit 202 at the receiving site (i.e., ordered versions), (3) the change to the AC data unit 202 reflected in the data change update "happened after" the latest change to the AC data unit 202 at the receiving site (i.e., ordered versions), (4) the change to the AC data unit 202 reflected in the data change update "happened concurrently with" the latest change to the AC data unit 202 at the receiving site (i.e., concurrent versions).

Scenario (1) above might, for example, occur if the receiving site previously received a data change update for the change to the AC data unit 202 from another replication peer. Scenario (2) above represents a situation where the latest change to the AC data unit 202 at the receiving site was made with "knowledge" of the prior change to the AC data unit 202 reflected in the data change update and thus, the latest version of the AC data unit 202 at the receiving site is a later version of the AC data unit 202 with respect to the version reflected in the data change update. Scenario (3) above represents a situation where the change to the AC data unit 202 reflected in the update was made with "knowledge" of the prior latest change to the AC data unit 202 at the receiving site and thus, the version to the AC data unit 202 reflected in the data change update is a later version of the AC data unit 202 with respect to the version at the receiving site. Scenario (4) above represents a situation where the change to the AC data unit 202 reflected in the data change update was made without "knowledge" of the latest change to the AC data unit 202 at the receiving site and the latest change to the AC data unit at the receiving site was made without "knowledge" of the change to the AC data unit 202 reflected in the data change update.

Various techniques for comparing two version vectors to determine whether the two versions are identical, ordered, or concurrent can be used. In one embodiment, comparing two version vectors includes comparing each logical clock in one version vector with the corresponding logical clock in the other version vector. Correspondence between logical clocks is determined based on the site the logical clocks correspond to. In particular, the logical clock for a site in one version vector is compared against the logical clock for the same site in the other version vector. Two versions are identical if each logical clock value in one version vector equals its corresponding logical clock value in the other version vector. The two versions are ordered if one version "happened before" the other. Version vector A happened before version vector B if each logical clock value in version vector B is greater than or equal to its corresponding logical clock value in version vector A and at least one logical clock value in version vector B is greater than its corresponding logical clock value in version vector A. Similarly, version vector B happened before version vector A if each logical clock value in version vector A is greater than or equal to its corresponding logical clock value in version vector B and at least one logical clock value in version vector A is greater than its corresponding logical clock value in version vector B. Two versions are concurrent if they are neither identical nor ordered.

Data Change Updates

Figure 5:
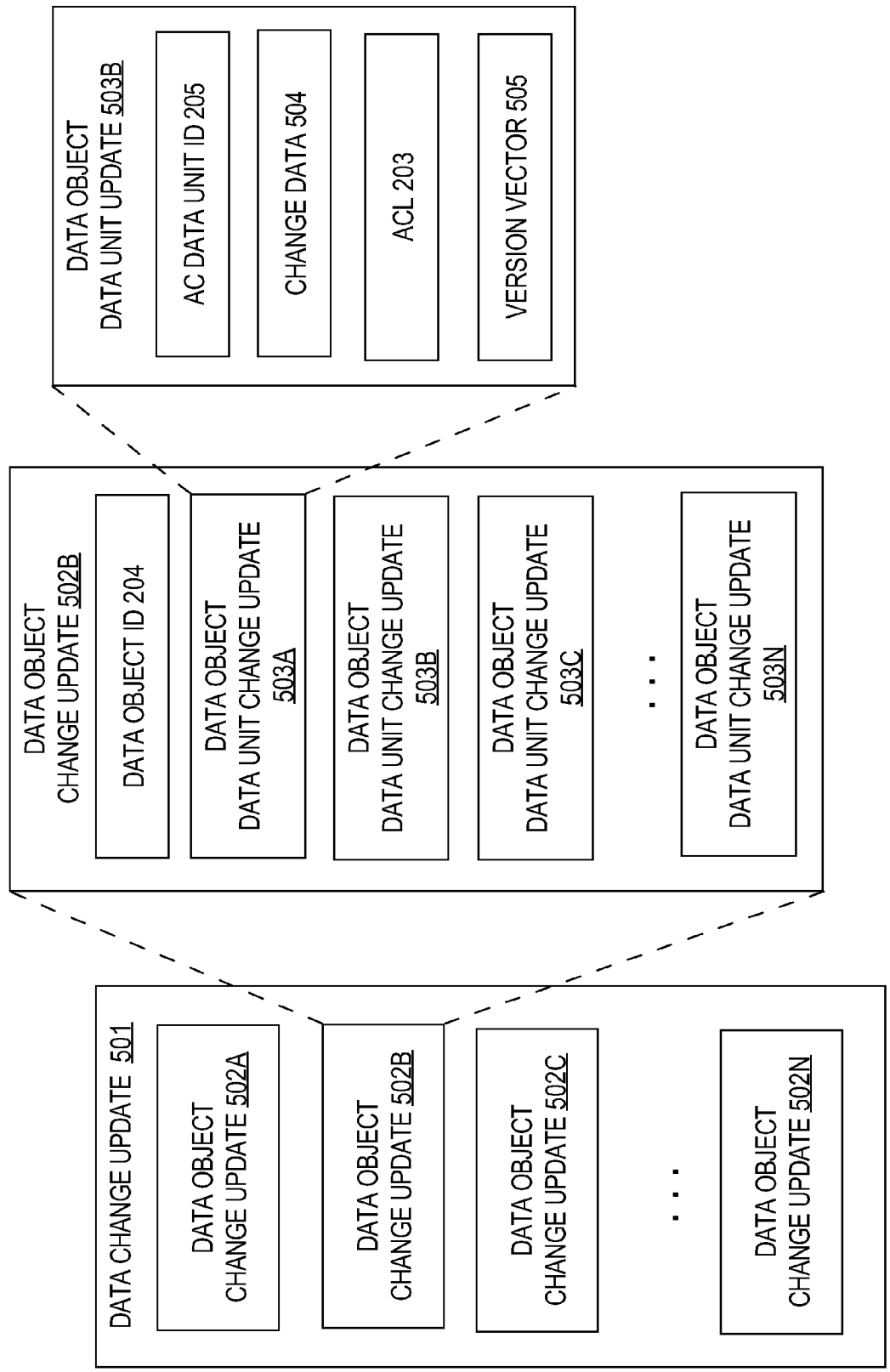
FIG. 5 is a block diagram of a data change update that includes data object data unit updates.

Referring now to FIG. 5, which is a block diagram of data change update 501 in one embodiment. The data change update 501 may be sent between replication peers to communicate data changes. The data change update 501 may be sent by a site 101, 102, 103, 104, etc. after making data changes to its local view 111, 112, 113, 1114, etc. The data change update 501 may also be sent by a site after applying a previous received data change update 501 received from another site. For example, referring to FIG. 1, if site 101 makes a data change to view 111, then a data change update A may be sent to site 102 and another data change update B may be sent to site 103, both updates A and B reflecting the data change made to view 111. After site 102 receives the data change update A sent to it by site 101 and applies the data change update A to its local view 112, site 102 may send a data change update C to site 104 reflecting the application of data change update A to view 112. Similarly, after site 103 receives the data change update B sent to it by site 102 and applies the data change update B to its local view 113, site 103 may send a data change update D to site 104 reflecting the application of data change update B to view 113.

Application of a received data change update 501 to a local view includes applying the results of any deconflicting to the local view. For example, if the data change update A received at site 102 includes data change conflicts with the local view 112, then the data change update C sent to site 104 may reflect the results of deconflicting those data change conflicts with the local view 112 as applied to local view 112.

After a site has applied a received data change update 501 and before the site sends a data change update 501 reflecting the application of the received data change update 501 to its local view to another site, the site may make data changes to its local view. Thus, the data change update 501 sent to the other site may reflect these "intermediary" changes. For example, data change update C sent to site 104 from site 102 may reflect changes to local view 112 that were made after site 102 applies data change update A to its local view 112.

As shown in FIG. 5, a data change update 501 may include one or more data object change updates 502A-N. Each data object change update 502A-N corresponds to a data change to a data object 201 at the site sending the data change update 501. In this context, a data change to the data object 201 refers to adding one or more AC data units 202 to the data object, deleting (removing) one or more AC data units 202 from the data object, and/or modifying one or more AC data units 202 of the data object.

Each data object change update 502A-N includes an identifier of the data object 204 and one or more data object data unit change updates (data unit change updates) 503A-N. Each data unit change update 503A-N corresponds to a data change to an AC data unit 202 of the data object 201. Thus, a data unit change update 503 may correspond to an AC data unit 202 that was added to the data object 201, an AC data unit 202 that was removed from the data object 201, or an AC data unit 202 of the data object 201 that was modified.

Each data unit change update 503 includes an identifier 205 of the corresponding AC data unit 202 that was added, deleted, or modified, change data 504, ACL 203, and version vector 505. The change data 504 is data that reflects the change to the corresponding AC data unit 202. The change data 504 may vary depending on how the corresponding AC data unit 202 was changed (added, deleted, or modified). If the corresponding AC data unit 202 was added to the data object 201, then the change data 504 may include the data that was added to the data object 201. If the corresponding AC data unit 202 was modified, then the change data 504 may include the modified data. If the corresponding AC data unit 202 was deleted, the change data 504 may include an indication that the corresponding AC data unit 202 was removed from the data object 201. The ACL 203 associated with the corresponding AC data unit 202 is included in the data unit change update 503. In this way, changes to ACLs 203 can be shared (replicated) throughout the multi-master system. The version vector 505 reflecting the version of the corresponding AC data unit 202 at the site sending the data change update 501 is also included.

In one embodiment, the data change update 501 is formatted as eXtensible Markup Language (XML) and sent between replication sites as XML. However, other data formats may be used in other embodiments.

Changing Site Replication Protocol

Figure 6:
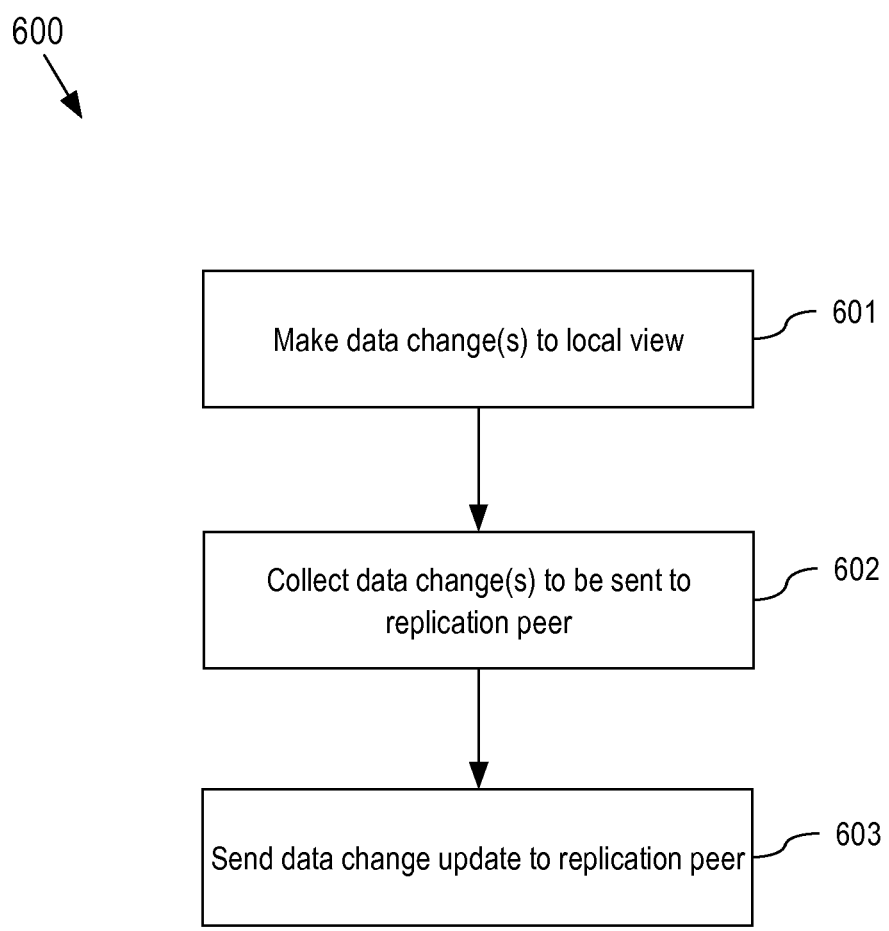
FIG. 6 is a flowchart of a replication protocol.

Referring now to FIG. 6, a flowchart 600 illustrates a replication protocol performed at a site 101, 102, 103, 104, etc. in context of making a data change to the site's local view and sharing the data change with a replication peer in a data change update 501. The data change can be initiated by a user or computing process. For example, a user may use a database application at the site to add, delete, or modify AC data units 202.

At step 601, a site (changing site) makes one or more data changes (add, delete, modify) to one or more AC data units 202 of the site's local view. These changes may occur over a period of time and over a number of different transactions. Thus, there is no requirement that the data changes be made as part of a single transaction. For each AC data unit 202 that is changed, a new version of the AC data unit 202 at the site is created. Accordingly, for each AC data unit 202 that is changed, the changing site increments the changing site's logical clock in the version vector for the AC data unit 202 by a fixed value (e.g., one) to reflect the new version of the AC data unit 202 at the changing site.

At step 602, the changing site collects the data changes to be sent to a replication peer in a data change update 501. The changing site may collect data changes on a periodic basis based on a time interval or in response to data changes being made or committed to the local view, as examples. This collection process may include obtaining, for each changed AC data unit 202, the identifier 205 of the AC data unit, the changed data 504, the ACL 203 associated with changed AC data unit 202, and version vector representing the new version of the AC data unit 202 at the changing site. This collection process may include filtering any changed AC data units 202 that should not be sent to the replication peer according to an ACL-based replication filter that the changing site is configured with.

At step 603, the changing site sends a data change update 501 to the replication site reflecting the data changes collected at step 602.

In one embodiment, steps 602 and 603 are repeated for each replication peer with which the changing site shares data changes.

Receiving Site Replication Protocol

Figure 7:
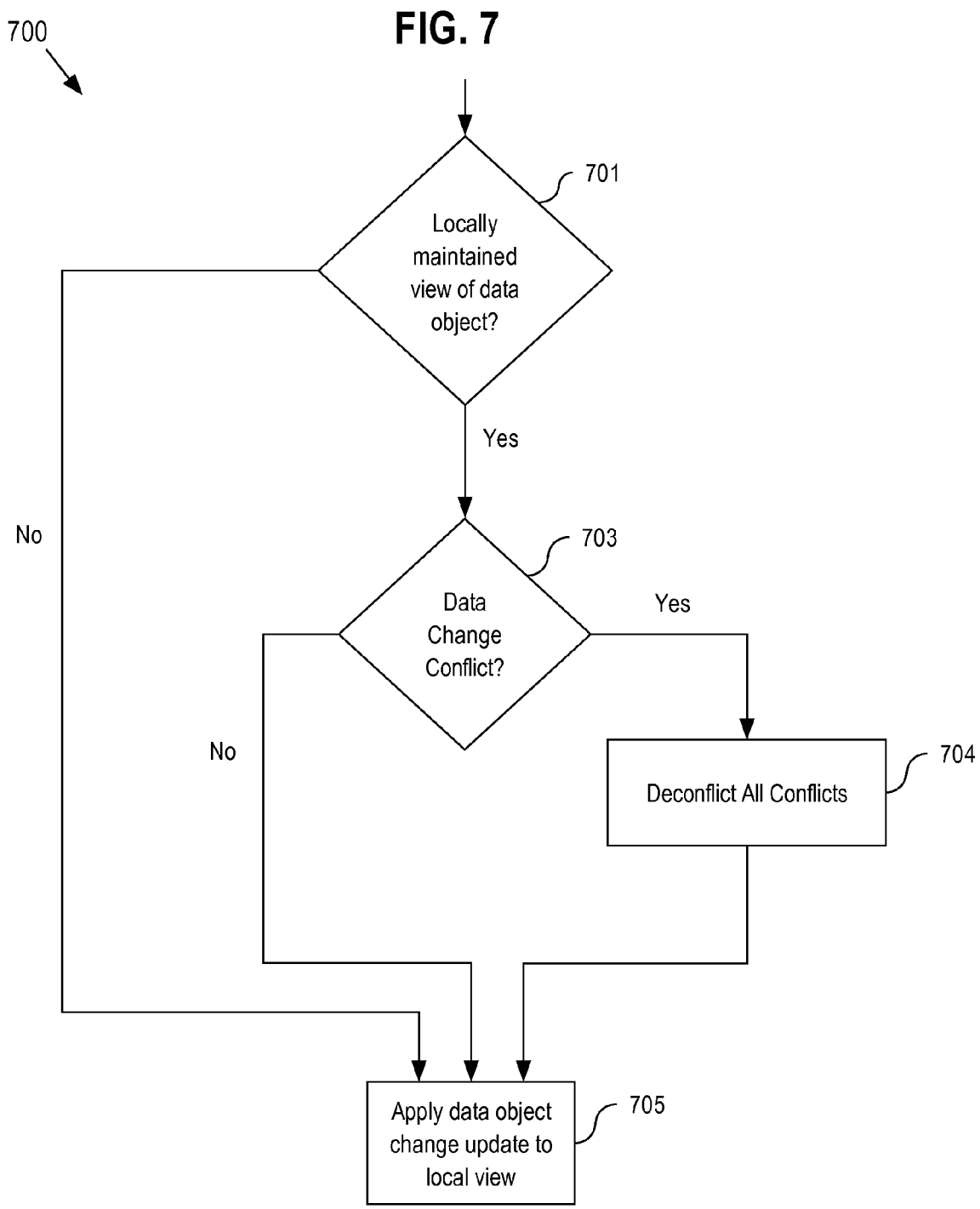
FIG. 7 is a flowchart of a replication protocol.

Referring now to FIG. 7, a flowchart 700 illustrates the replication protocol performed at a site 101, 102, 103, 104, etc. in response to receiving a data change update 501 from a peer site. As discussed above, the data change update 501 includes one or more data object change updates 502 corresponding to one or more data objects 201 that were changed at one or more other replication sites in the multi-master system. Process 700 is performed at the site receiving the data change update 501 (receiving site) in the context of each data object change update 502 contained in the data change update 501.

At step 701, the receiving site determines whether it locally maintains a view of the data object 201 that is the subject of the data object change update 502. This determination may be based on the data object identifier 204 included in the data object change update 502. If the receiving site does not yet maintain a view of the data object 201, then process 700 proceeds to step 705 at which the data object change update 502 is applied to the receiving site's local view. On the other hand, if the receiving site does maintain a view of the data object 201, then process 700 proceeds to step 704 at which the receiving site determine whether there are any data change conflicts between the data object change update 502 and the receiving site's view of the data object 201.

To determine whether there are any data change conflicts between the data object change update 502 and the receiving site's view of the data object 201, the receiving site compares the version vector 505 of each data unit update 503 to the version vector of the corresponding ACL data unit 202 maintained at the receiving site, if one exists. If the receiving site does not maintain a corresponding ACL data unit 202 for a given data unit update 503, then no data change conflict exists with respect to that given data unit update 503. If, however, the receiving site does maintain a corresponding ACL data unit 202 for the given data unit update 503, then the version vector 505 associated with the given data unit update 503 is compared to the version vector associated with the corresponding ACL data unit 202 maintained at the receiving site to determine whether the two versions are identical, ordered, or concurrent. If the two versions are concurrent, then a data change conflict between the data object change update 502 and the receiving site's view of the data object 201 has been detected. There may be multiple of such data change conflicts for a given data object change update 502.

If there is at least one data change conflict between the data object change update 502 and the receiving site's view of the data object 201, then, at step 704, the receiving site deconflicts all such conflicts between the data object change update 502 and the receiving site's view of the data object 201. In general, deconflicting a data change conflict between a data unit update 503 and a corresponding AC data unit 202 maintained at the receiving site involves choosing one of the data unit update 503, the corresponding AC data unit 202, or a new AC data unit 202 to adopt as the new version of the AC data unit 202 at the receiving site. In some cases, the receiving site makes this selection automatically without requiring user intervention based on a set of pre-defined rules or heuristics. In other cases, user intervention is used to make the selection. In cases of user intervention, the data object change update 502 may be placed in a pending queue until a user is able to make a selection.

At step 705, after any data change conflicts between the data object change update 502 and the receiving site's view of the data object 201 have been deconflicted, the data object change update 502 is applied to the receiving site's view on a per-data unit update 503 basis as follows.

If the receiving site does not maintain an AC data unit 202 for the data object 201 that corresponds to the data unit update 503, then the data unit update 503 represents an AC data unit 202 to be added to the data object 201 maintained at the receiving site. In this case, a new AC data unit 202 is created for the data object 201 maintained at the receiving site with an identifier 205 of the identifier 205 contained in the data unit update 503 and having the data of the change data 504 in the data unit update 503. The new AC data unit 202 is associated at the receiving site with the ACL 203 in the data unit update 503 and the version vector 505 in the data unit update 503. As a result, the receiving site now maintains a version of the AC data unit 202 identical to the version of the AC data unit 202 represented by the data unit update 503.

On the other hand, if the receiving site does maintain a corresponding AC data unit 202 for the data unit update 503, then how the data unit update 503 is applied to the receiving site's view depends on whether the version of the AC data unit 202 represented by the data unit update 503 is identical to, ordered before, ordered after, or concurrent with the version of the corresponding AC data unit 202 maintained at the receiving site as indicated by the respective version vectors.

If the version of the AC data unit 202 represented by the data unit update 503 is identical to the version of the corresponding AC data unit 202 maintained at the receiving site, then the receiving site need not apply the data unit update 503 to the receiving site's view as the receiving already maintains the same version of the AC data unit 202 that is represented by the date unit update 503.

If the version of the AC data unit 202 represented by the data unit update 503 is ordered before the version of the corresponding AC data unit 202 maintained at the receiving site, then the receiving also need not apply the data unit update 503 to the receiving site's view as the receiving site maintains a later version than that of the AC data unit 202 represented by the data unit update 503.

If the version of the AC data unit 202 represented by the data unit update 503 is ordered after the version of the corresponding AC data unit 202 maintained at the receiving site, then the receiving site applies the data unit update 503 to the corresponding AC data unit 202 maintained at the receiving site. Applying the data unit update 503 includes applying the change data 504 and the ACL 203 of the data unit update 503 to the corresponding AC data unit 202 maintained at the receiving site to produce an updated version of the AC data unit 202 maintained at the receiving site that reflects the update to the AC data unit 202 represented by the data unit update 503. In this case where the version of the AC data unit 202 represented by the data unit update 503 is ordered after the version of the corresponding AC data unit 202 maintained at the receiving site, the receiving site generates a new version vector for the AC data unit 202 maintained at the receiving site by merging the version vector 505 in the data unit update 503 with the current version vector associated with the AC data unit 202 maintained at the receiving site. Merging the two version vectors includes merging each logical clock in the version vector 505 with the corresponding logical clock in the receiving site's version vector for the AC data unit 202. Merging two logical clocks includes choosing the numerically greater of the two corresponding logic clocks as the value of the corresponding logical clock in the new version vector. What is produced by this merging is a new version vector for the updated AC data unit 202 maintained at the receiving site that is ordered after both the version vector 505 in the data unit update 503 and the former version vector for the AC data unit 202 at the receiving site. Stated otherwise, the receiving site's former version vector for the AC data unit 202 and the version vector 505 now both happened before the new version vector. After the two version vectors are merged, the receiving site's version vector for the AC data unit 202 is replaced with the new version vector which then becomes the version vector for the AC data unit 202 at the receiving site.

If the version of the AC data unit 202 represented by the data unit update 503 is concurrent with the version of the corresponding AC data unit 202 maintained at the receiving site, then the receiving site applies the results of the deconfliction between the data unit update 503 and the receiving site's view of the corresponding AC data unit 202 to the receiving site's view of the corresponding AC data unit 202. This results in a new version of the AC data unit 202 at the receiving site. As with the case where the version of the AC data unit 202 represented by the data unit update 503 is ordered after the version of the corresponding AC data unit 202 maintained at the receiving site, the receiving site produces a merged version vector for the new version of AC data unit 202 maintained at the receiving site by merging the version vector 505 in the data unit update 503 with the version vector associated the AC data unit 202 maintained at the receiving site. However, in contrast to the case where the version of the AC data unit 202 represented by the data unit update 503 is ordered after the version of the corresponding AC data unit 202 maintained at the receiving site, in the case where the version of the AC data unit 202 represented by the data unit update 503 is concurrent with the version of the corresponding AC data unit 202 maintained at the receiving site, the merged version vector is also incremented. In particular, the logical clock in the merged version vector corresponding to the receiving site is incremented by a fixed value (e.g., one) and the resulting incremented version vector becomes the new version vector associated with the new version of the AC data unit 202 maintained at the receiving site.

A Replication Example

An example showing how the above-described replication protocol may be used to facilitate cross-ACL multi-master replication will now be described. The example makes reference to the multi-master system of FIG. 3 that includes four replication sites 101, 102, 103, and 104. In the following example, a particular notation of the form <X, Y, Z, W> is used to represent version vectors, where X is the logical clock value for Site 101 in the version vector, Y is the logical clock value for Site 102 in the version vector, Z is the logical clock value for Site 103 in the version vector, and W is the logical clock value for Site 104 in the version vector.

Event 1

Assume, at Site 101, a data record $R_{101}$ is created in view 111 with values for three fields: "Name"="John Smith", "Social Security Number"="800-88-8888", and "Home Address"="123 Secret Street". The data record $R_{101}$ corresponds to a data object 201 and each of the three fields corresponds to an AC data unit 202. After the data record $R_{101}$ is created, each of the three fields are associated version vectors at Site 101 as follows:
 "Name"="John Smith": <1, 0, 0, 0>
 "Social Security Number"="800-88-8888": <1, 0, 0, 0>
 "Home Address"="123 Secret Street": <1, 0, 0, 0>
Assume, at Site 101, the "Social Security Number" field is classified as "Private" according to an associated ACL 203 while the "Home Address" field is classified as "Personal" according to an associated ACL 203. The "Name" field is not associated with any ACL 203.

Assume Filter 301A at Site 101 is configured to filter any AC data units 202 classified according to an associated ACL 203 as "Private". While filter 301B at Site 101 is configured to filter any AC data units 202 classified according an associated ACL 203 as "Personal". Thus, Site 102 may receive information from Site 101 that Site 103 may not receive and Site 103 may receive information from Site 101 that Site 102 may not receive.

Event 2

Assume Site 101 sends a data change update 501 to Site 102 in accordance with the Filter 301A configured at Site 101. As a result, a data object change update 502 corresponding to record $R_{101}$ sent to Site 102 as part of the data change update 501 includes the following information:
 "Name"="John Smith": No ACL: <1, 0, 0, 0>
 "Home Address"="123 Secret Street": "Personal" ACL: <1, 0, 0, 0>

The data change update 501 sent to Site 102 does not include any information about the "Social Security Number" field of record $R_{101}$ in accordance with the filter 301A at Site 101.

In response to receiving the data change update 501 from Site 101, Site 102 creates a data record $R_{102}$ in view 112 with associated version vectors as follows:
 "Name"="John Smith": <1, 0, 0, 0>
 "Home Address"="123 Secret Street": <1, 0, 0, 0>

Event 3

Assume Site 101 sends a data change update 501 to Site 103 in accordance with the Filter 301B configured at Site 101. As a result, a data object change update 502 corresponding to record $R_{101}$ sent to Site 103 as part of the data change update 501 includes the following information:
 "Name"="John Smith": No ACL: <1, 0, 0, 0>
 "Social Security Number"="800-88-8888": "Private" ACL: <1, 0, 0, 0>

The data change update 501 sent to Site 103 does not include any information about the "Home Address" field of record $R_{101}$ in accordance with the filter 301B at Site 101.

In response to receiving the data change update 501 from Site 101, Site 103 creates a data record $R_{103}$ in view 113 with associated version vectors as follows:
 "Name"="John Smith": <1, 0, 0, 0>
 "Social Security Number"="800-88-8888": <1, 0, 0, 0>

Event 4

Assume the value of the "Name" field of data record $R_{102}$ in view 112 at Site 102 is changed from "John Smith" to "John M. Smith". As a result, the version vectors at Site 102 associated with data record $R_{102}$ are as follows:
 "Name"="John M. Smith": <1, 1, 0, 0>
 "Home Address"="123 Secret Street": <1, 0, 0, 0>

At the same time, assume the value of the "Name" field of data record $R_{103}$ in view 113 is changed from "John Smith" to "Jonathan Smith" As a result, the version vectors at Site 103 associated with data record $R_{103}$ are as follows:
 "Name"="Jonathan Smith": <1, 0, 1, 0>
 "Social Security Number"="800-88-8888": <1, 0, 0, 0>

After these concurrent changes, there is a data change conflict between the "Name" field of data record $R_{102}$ in view 112 and the "Name" field of data record $R_{103}$ in view 113.

Event 5

Assume that Filter 302B at Site 102 places no restrictions on the AC data units 202 in view 112 that can be shared with Site 104.

Further assume that Site 102 sends a data change update 501 to Site 104. As a result, a data object change update 502 corresponding to record $R_{102}$ sent to Site 104 as part of the data change update 501 includes the following information:
 "Name"="John M. Smith": No ACL: <1, 1, 0, 0>
 "Home Address"="123 Secret Street": "Personal" ACL: <1, 0, 0, 0>

In response to receiving the data change update 501 from Site 102, Site 104 creates a data record $R_{104}$ in view 114 with associated version vectors as follows:

"Name"="John M. Smith": <1, 1, 0, 0>
"Home Address"="123 Secret Street": <1, 0, 0, 0>

Event 6

Assume that Filter 303B at Site 103 places no restrictions on the AC data units 202 in view 112 that can be shared with Site 104.

Further assume that Site 103 sends a data change update 501 to Site 104. As a result, a data object change update 502 corresponding to record $R_{103}$ sent to Site 104 as part of the data change update 501 includes the following information:

"Name"="Jonathan Smith": <1, 0, 1, 0>
"Social Security Number"="800-88-8888": <1, 0, 0, 0>

In response to receiving the data change update 501 from Site 103, in accordance with the replication protocol, Site 104 detects the data change conflict between the "Name" field as sent in the data change update 501 from Site 103 and the Name field as maintained in view 114 as part of data record $R_{104}$. In particular the respective version vectors are neither identical nor ordered and thus are concurrent. After the data change conflict has been deconflicted, assuming "John M. Smith" is selected in the deconfliction process, Site 104 applies the data change update 501 to view 114 in accordance with the replication protocol resulting in a data record $R_{104}$ as follows:

"Name"="John M. Smith": <1, 1, 1, 1>
"Social Security Number"="800-88-8888": <1, 0, 0, 0>
"Home Address"="123 Secret Street": <1, 0, 0, 0>

Significantly, as a result of versioning each AC data unit 202 separately with version vectors, Site 104 was able to determine that the data change update 501 sent from Site 103 to Site 104 did not represent a deletion of the "Home Address" field.

Subset/Partial Replication

In one embodiment, a site 101, 102, 103, 104, etc. is configured to replicate only data changes that are made to a specified portion of its local view with a peer replication site instead of replicating all data changes that are made to the local view with the peer replication site. For example, site 101 may be configured to share data changes made to only a portion of view 111 with site 102. This subset/partial replication operates independently of any ACL-based replication filters the site might be configured with. Thus, a site can be configured to perform subset/partial replication and configured with an ACL-based replication filter that the site applies to data changes that fall within the portion of the view to be replicated.

In one embodiment, a user specifies criteria defining the portion of the view to be replicated to the peer site. The site uses the criteria to identify data objects 201 stored in the site's local view that are within the subset/portion to be replicated. The user-specified criteria can be in the form of a query or a filter or a combination of queries and filters. A query specifies selection criteria that objects 201 in the local view must satisfy (or not satisfy as the query may specify) to be considered by the site to be within the subset/portion. A query may contain simple search terms, such as strings of text, or various types of complex expressions in which multiple search terms and search expressions are combined using logical operators such as AND, OR, and NOT. A filter selects objects 201 in the local view by examining objects 201 within a specific group of objects 201 and selecting objects 201 within the specific group that satisfy the filter's selection criteria. A query may be combined with a filter such that the query selects a specific group of objects 201 to which the filter is applied to produce a final set of selected objects 201.

In one embodiment, to aid in determining what data changes in the subset/portion should be shared with the peer site, the peer site maintains an "acknowledgement" version vector for the subset/portion which the peer site periodically shares with the site defining the subset/portion. At any given time, this acknowledgement version vector reflects a merging of all version vectors associated with all AC data units 202 that are within the subset/portion maintained in the peer site's local view. When the site defining the subset/portion shares a data change with the peer site, the peer system is guaranteed to have successfully already received all changes that are ordered before (i.e., happened before) the peer site's acknowledgement version vector. Thus, the site defining the subset/portion need not send those changes to the subset/portion that are ordered before (i.e., happened before) the peer site's global acknowledgement version vector.

Implementing Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
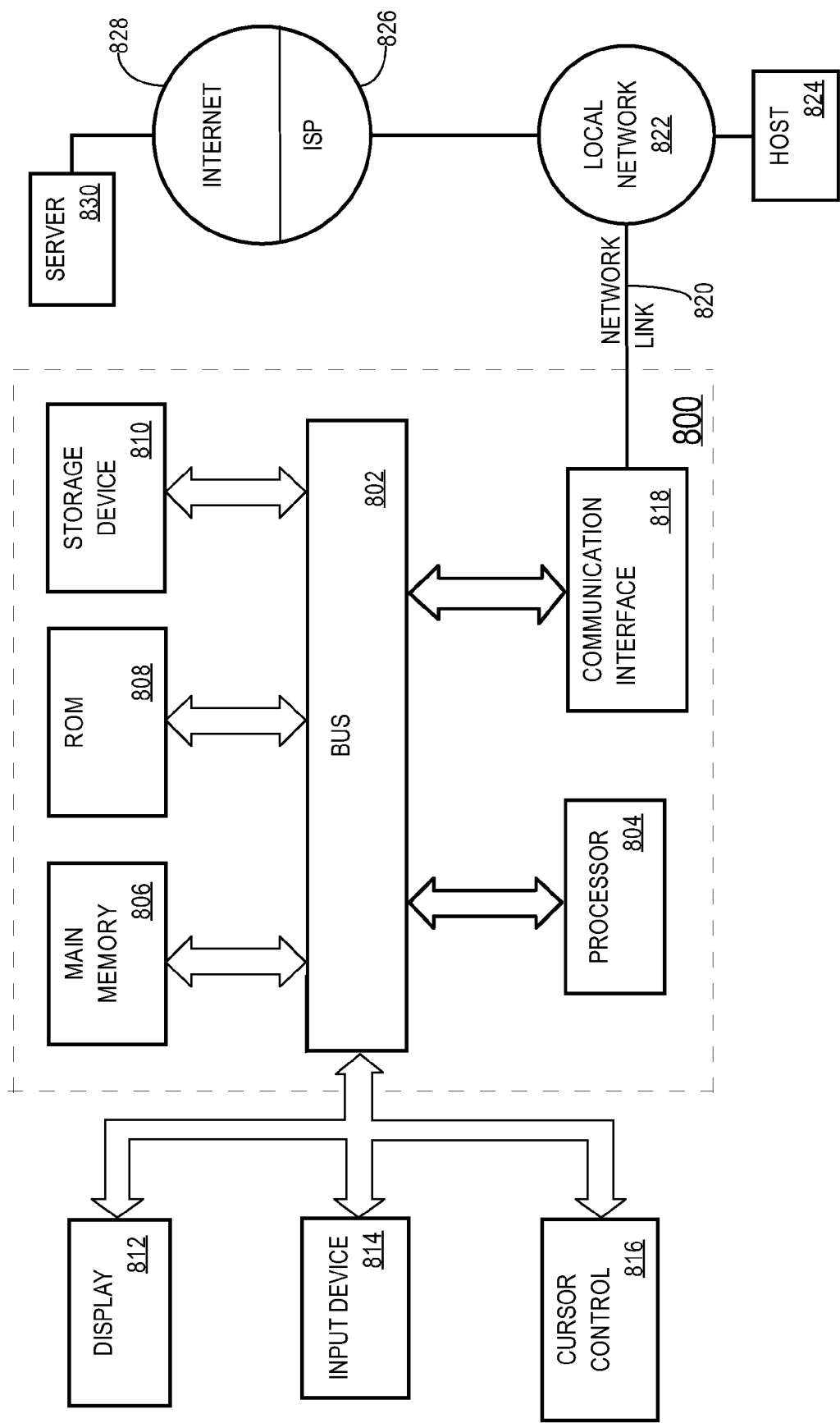
FIG. 8 is a block diagram of a computer system on which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "non-transitory media" as used herein refers to any media that store data and/or instructions that cause a machine to operation in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
   at a first replication site of a plurality of replication sites:
   receiving a first update to a data record from a second replication site of the plurality of replication sites;
   receiving a second update to the data record from a third replication site of the plurality of replication sites;
   wherein the first update comprises a first value for a first field of the data record and a first value for a second field of the data record;
   wherein the second update comprises a second value for the first field and a first value for a third field of the data record;

wherein the first update does not include a value for the third field;

wherein the second update does not include a value for the second field;

responsive to receiving the first update, creating the data record in a database comprising the first value for the first field and the first value for the second field;

responsive to receiving the second update, detecting a concurrency conflict between the first value for the first field of the data record in the database and the second value for the first field in the second update;

after the concurrency conflict is deconflicted, updating the data record in the database to include a deconflicted value for the first field and the first value for the third field from the second update;

wherein the method is performed by one or more computing devices at the first replication site.

2. The method of claim 1, wherein detecting the concurrency conflict comprises comparing a first version vector to a second version vector, and determining the concurrency conflict exists based on results of the comparing.

3. The method of claim 1, further comprising automatically deconflicting the concurrency conflict.

4. The method of claim 1, wherein the deconflicted value for the first field is one of the first value for the first field or the second value for the first field.

5. The method of claim 1, wherein the deconflicted value for the first field is neither the first value for the first field nor the second value for the first field.

6. A method comprising:

at a first replication site of a plurality of replication sites:

receiving a first update to a file from a second replication site of the plurality of replication sites;

receiving a second update to the file from a third replication site of the plurality of replication sites;

wherein the first update comprises a first value for a first portion of the file and a first value for a second portion of the file;

wherein the second update comprises a second value for the first file portion and a first value for a third portion of the file;

wherein the first update does not include a value for the third portion;

wherein the second update does not include a value for the second portion;

responsive to receiving the first update, creating the file in a data storage medium comprising the first value for the first portion and the first value for the second portion;

responsive to receiving the second update, detecting a concurrency conflict between the first value for the first portion of the file in the data storage medium and the second value for the first portion in the second update;

after the concurrency conflict is deconflicted, updating the file in the data storage medium to include a deconflicted value for the first portion and the first value for the third portion from the second update;

wherein the method is performed by one or more computing devices at the first replication site.

7. The method of claim 6, wherein detecting the concurrency conflict comprises comparing a first version vector to a second version vector, and determining the concurrency conflict exists based on results of the comparing.

8. The method of claim 6, further comprising automatically deconflicting the concurrency conflict.

9. The method of claim 6, wherein the deconflicted value for the first field is one of the first value for the first field or the second value for the first field.

10. The method of claim 6, wherein the deconflicted value for the first field is neither the first value for the first field nor the second value for the first field.

11. One or more non-transitory computer-readable media storing instructions which, when executed by one or more computing devices at a first replication site of a plurality of replication sites, causes the one or more computing devices to perform the method of claim 1.

12. One or more non-transitory computer-readable media storing instructions which, when executed by one or more computing devices at a first replication site of a plurality of replication sites, causes the one or more computing devices to perform the method of claim 6.

13. A method comprising:

at a first replication site of a plurality of replication sites, the first replication site comprising one or more computing devices and a first database, the one or more computing devices at the first replication site performing the steps of:

storing, in the first database, a data object comprising a first value for a first property of the data object, a first value for a second property of the data object, and a first value for a third property of the data object;

filtering, from a first update to be sent to a second replication site of the plurality of replication sites, the first value for the third property, based on a first access control list associated in the first database with the third property and based on a first access control filter that governs sharing of information in the first database by the first replication site with the second replication site;

filtering, from a second update to be sent to a third replication site of the plurality of replication sites, the first value for the second property, based on a second access control list associated in the first database with the second property and based on a second access control filter that governs sharing of information in the first database by the first replication site with the third replication site;

at a fourth replication site of the plurality of replication sites, the fourth replication site comprising one or more computing devices and a second database, the one or more computing devices at the fourth replication site performing the steps of:

receiving a third update to the data object from the second replication site;

receiving a fourth update to the data object from the third replication site;

wherein the third update comprises a second value for the first property and the first value for the second property;

wherein the fourth update comprises a third value for the first property and the first value for the third property;

responsive to receiving the third update, creating the data record in the second database comprising the second value for the first property and the first value for the second property;

responsive to receiving the fourth update, detecting a concurrency conflict between the second value for the first property of the data record in the second database and the third value for the first property in the fourth update;

after the concurrency conflict is deconflicted, updating the data record in the second database to include a deconflicted value for the first property and the first value for the third property from the fourth update.

14. The method of claim 13, wherein detecting the concurrency conflict comprises comparing a first version vector to a second version vector, and determining the concurrency conflict exists based on results of the comparing.

15. The method of claim 13, further comprising automatically deconflicting the concurrency conflict.

16. The method of claim 13, wherein the deconflicted value for the first property is one of the second value for the first property or the third value for the first property.

17. The method of claim 13, wherein the deconflicted value for the first property is neither the second value for the first property nor the third value for the first property.

18. The method of claim 13, wherein the first access control list associated in the first database with the third property comprises a security classification level; and wherein the first access control filter is configured to prevent the first replication site from sharing, with the second replication site, information in the first database associated with the security classification level.

19. The method of claim 13, wherein the second access control list associated in the first database with the second property comprises a security classification level; and wherein the second access control filter is configured to prevent the first replication site from sharing, with the third replication site, information in the first database associated with the security classification level.

20. A system comprising:
one or more computing devices and a first database at a first replication site of a plurality of replication sites;
one or more computing devices at a second replication site of the plurality of replication sites;
one or more computing devices at a third replication site of the plurality of replication sites;
one or more computing devices at a fourth replication site of the plurality of replication sites;
wherein the one or more computing devices at the first replication site are configured to:
store, in the first database, a data object comprising a first value for a first property of the data object, a first value for a second property of the data object, and a first value for a third property of the data object;
filter, from a first update to be sent to the second replication site, the first value for the third property, based on a first access control list associated in the first database with the third property and based on a first access control filter that governs sharing of information in the first database by the first replication site with the second replication site;
filter, from a second update to be sent to the third replication site, the first value for the second property, based on a second access control list associated in the first database with the second property and based on a second access control filter that governs sharing of information in the first database by the first replication site with the third replication site;
wherein the one or more computing devices at the fourth replication site are configured to:
receive a third update to the data object from the second replication site;
receive a fourth update to the data object from the third replication site;
wherein the third update comprises a second value for the first property and the first value for the second property;
wherein the fourth update comprises a third value for the first property and the first value for the third property;
responsive to receiving the third update, create the data record in the second database comprising the second value for the first property and the first value for the second property;
responsive to receiving the fourth update, detect a concurrency conflict between the second value for the first property of the data record in the second database and the third value for the first property in the fourth update;
after the concurrency conflict is deconflicted, update the data record in the second database to include a deconflicted value for the first property and the first value for the third property from the fourth update.

* * * * *